June 8, 1948. C. S. POPE 2,443,012
VALVE WASHER
Filed April 17, 1946
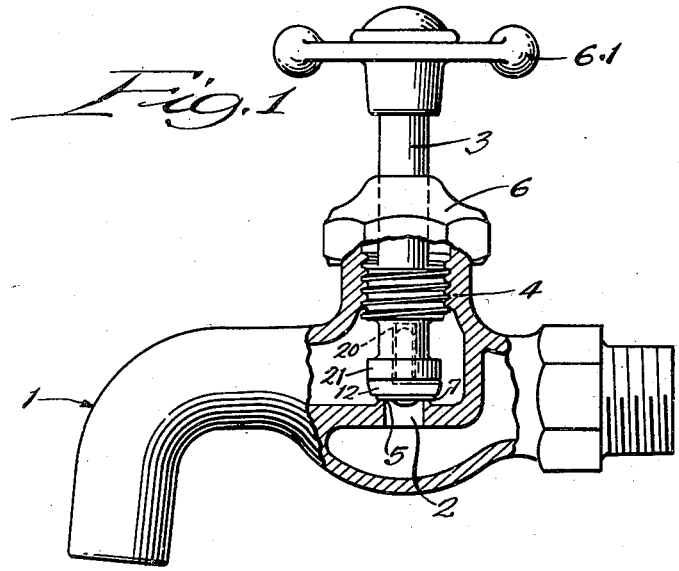
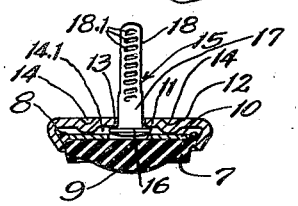
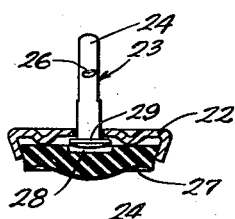
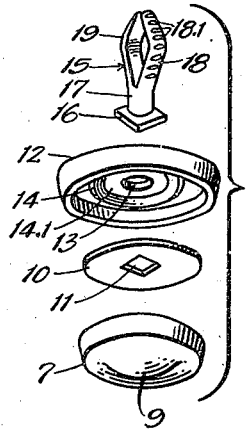
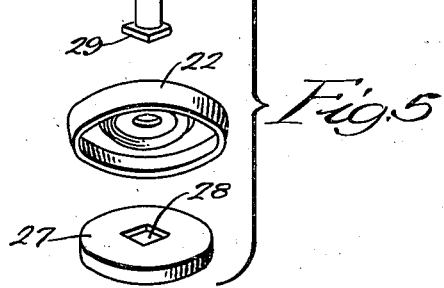
Inventor:
Charles S. Pope,
By Hummler Hummler & Davis
Attorneys.

Patented June 8, 1948

2,443,012

UNITED STATES PATENT OFFICE 2,443,012

VALVE WASHER

Charles S. Pope, Riverside, Ill., assignor to Snap Products Co., Chicago, Ill., a corporation of Illinois Application April 17, 1946, Serial No. 662,703

11 Claims. (Cl. 251—160)

This invention relates to improvements in seating gaskets or washers of the type employed on movable valve stems, such as are used in water faucets and the like.

Heretofore all devices of this character were of two general types; that is, non-rotatable gaskets rigidly attached to the movable valve stem; and gaskets carried by and rotative relative to the movable valve stem.

When the non-rotatable type of gasket was used it proved to be inefficient and unsatisfactory in that when the valve stem was turned down, a rotating or circular movement was imparted to the gasket, and such circular movement of the gasket on the port edges soon wore the gasket through, necessitating replacement.

The short life and generally unsatisfactory performance of this type of washer have resulted in many attempts to provide an improvement, but so far all such attempts have been less than completely successful. Many types of so-called "swivel" washers have been introduced. While most of these did remove the objection of grinding away the face of the washer against the seat, practically all of them contained another undesirable feature, namely, an insecure and loose connection between the washer and the faucet stem. Such a connection permits the washer to seat and wear unevenly or off-center and in some cases even to become entirely displaced so as to cease to function at all. In other cases the washer may become jammed or stuck in the bore of the seat so as to remain there when the stem is raised and thus prevent opening of the port and the flow of water also. Although certain types heretofore produced may function satisfactorily in other respects, the loose connection permits them to rattle or chatter on the end of the valve stem and thus produce loud and objectionable noises when water flows through the faucet.

The present invention provides a valve washer which while locked securely to the end of the valve stem, still permits free swivel action of the washer; and which overcomes the objectionable features of preceding types of washers in a single, simple unit that is easy to install, inexpensive to manufacture and universally adaptable to a great majority of the common type of faucets now in service and currently being produced.

The main objects of this invention are to provide an improved valve washer which is rotatable relative to its supporting valve stem; to provide a washer of this character which can be set up snugly against the face of the valve stem; to provide such a washer that can be quickly and readily replaced; to provide such a washer having a self-adjusting securing means adaptable to fit various sizes of faucet stem bores and different kinds of threads therein; to provide a washer wherein the face surface thereof will uniformly seat itself on the valve port of a faucet upon closure thereon; to provide a washer of this character wherein the securing means thereof may be screwed into the faucet stem by turning the washer and yet when the washer is snugly seated against the face of the stem, the washer is freely rotatable; and to provide an easily installed washer of this character which is simple in construction and inexpensive to manufacture.

An illustrative embodiment of this invention is shown in the accompanying drawing in which;

Figure 1 is a side elevation, partly in section, of a standard type of faucet showing the improved washer secured in the faucet stem.

Fig. 2 is a sectional view of the improved washer.

Fig. 3 is a perspective view of the washer of Fig. 2 showing the parts thereof separated but in their proper relative position.

Fig. 4 is a sectional view of a modified form of the improved washer, and

Fig. 5 is a perspective view of the washer of Fig. 4 showing the parts of the washer separated but in their proper relative positions.

Referring in detail to the drawings, the faucet indicated generally by the numeral 1 is of the standard type having an inlet port 2, which is shown closed by the hereinafter described washer, the usual rotary valve stem 3 which is threaded into the body 4 so as to have rotary longitudinal movement therein toward and from the seat 5 surrounding the port 2. The stem 3 is normally held against withdrawal from the faucet body by a bonnet 6. The stem 3 is also provided with a handle 6.1.

The port-closing washer comprises a gasket 7, of rubber or other suitable material, preferably provided with a flat recessed top 8, and a partially convex bottom surface 9. The convex portion is adapted to be received into the port while the outer periphery of the gasket abuts against the seat 5. As shown, a thin flat washer 10, of slightly less diameter than gasket 7, preferably made of metal, is provided with a polygonal perforation 11 and is set into the recessed portion on the top surface of the gasket 7.

The gasket retainer shell 12, having a centrally positioned aperture 13 therein, is preferably constructed of metal, and is provided with an annular groove or channel 14 in its upper surface. The channel 14 is smaller in diameter than the diameter of the washer 10 and provides an annular ridge on the inside of the shell 12 against which the washer 10 rests and is prevented from coming into flat contact with the inner top surface of the shell 12. The gasket 7 and the washer 10 are positioned in the shell 12 and held therein by rolling, bending or curling the outer edges of the shell inwardly whereby the washer 10 is firmly seated against the ridge formed by the channel or groove 14 and is held against relative rotary movement.

In the form shown, the washer stud or securing means 15 is provided with a head 16 formed to fit into the aperture 11, and a shank 17 having its free end cleft lengthwise to form spring prongs or engaging arms 18 and 19. The arms are preferably bent outwardly intermediate their ends so as to provide outwardly bowed resilient gripping members adapted to fit into and securely engage the faucet stem bore. As shown, each prong or arm of the stud is preferably threaded or provided with diagonally disposed grooves 18.1 on its outer surface.

Such construction of the stud provides a screw type of fastening that is self-adjusting in diameter to fit several sizes of the holes that might be encountered in its use. Also, since only those one or two threads 18.1 at the bowed portions of the stud are effective, variations in the pitch of the threads in the valve stem bore do not affect the use of the improved washer stud. Thus the stud is, in effect, a universal or all purpose screw.

It is to be noted especially from Fig. 2 that there is a central chamber, indicated generally by the numeral 14.1, defined by the annular channel 14, the inner face of the top wall of the retainer shell 12 and the upper face of the washer 10. The chamber 14.1 is of a depth sufficient to loosely receive the head 16 of the stud 15 whereby relative rotary movement of shell 12 may take place when the head 16 is so received.

In operation the valve stem 3 is removed from the faucet body in the usual manner and the prong arms 18 and 19 are forced into the threaded bore 20 as far as they will go. The shell 12 is then moved upwardly by hand on the stud shank 17 and turned in a clockwise or right-hand direction until the head 16 of the washer stud 15 seats itself in the aperture 11 of the washer. When so engaged continued turning will cause the threads or notches 18.1 of the prongs 18 and 19 to screw the stud into the bore 20 and draw the retaining shell up firmly against the face 21 of the valve stem. Further turning of the shell 12 will cause the head 16 to be withdrawn from the aperture 11, through the action of the screw threads, so that the head of the stud will become disengaged from the disc 10 and the washer will be free to turn relative to the valve stem. This is the relation shown in Fig. 2.

Figures 4 and 5 illustrate a modification of my invention wherein the washer 10 of the preferred embodiment is eliminated from the assembly. In this form the construction of the retaining shell 22 is identical with the heretofore described shell 12; and the washer stud 23 is similar to the stud 15 with the single exception that the arms 24—25 thereof are each provided with a diagonally disposed thread segment 26. The thread segment 26 is located at the outermost projecting part of each prong 24—25 whereby the edges thereof will engage the threads of the bore 20 of the faucet stem 3. The gasket 27 is similar to gasket 7 and differs only in having a polygonal pocket 28 in the top surface thereof. The pocket 28 is adapted to receive and key to the correspondingly shaped head 29 of the stud 23. The units are assembled and held together as heretofore described for the preferred embodiment of my invention.

The operation of the modified form of the prong is the same as the preferred embodiment except the head 29 seats in the pocket 28 instead of the disc aperture 11 of the preferred embodiment. When the shell is secured against the valve stem face by screwing the stud into the valve stem bore, the head 29 is withdrawn from the pocket 28 by further turning of the shell until the shell is free to rotate about the stud shank.

It is to be understood that any suitable means may be employed to disengageably key the washer and the head of the stud, such as a ridge on one member and a coacting slot in the other member.

Although two specific embodiments of this invention are herein shown and described, it will be understood that numerous details of the structures shown may be altered or omitted without departing from the spirit of the invention as defined by the following claims.

I claim:

1. In a device of the class described comprising a gasket, a retaining shell containing one face of said gasket, and a stud extending centrally from said shell and having a non-circular head at its inner end, means arranged to engage the head of said stud and hold the same against relative rotation when said shell is shifted axially on said stud away from said head.

2. A device of the class described, comprising a gasket, a retaining shell for said gasket enclosing the upper face thereof and having a central aperture, means arranged to space said shell away from the upper face of said gasket and to provide a central chamber between said gasket and shell, a stud having a non-circular head disposed within said chamber and a shank extending through the aperture of said shell, and means below said chamber arranged to engage the head of said stud and hold the same against relative rotation when said shell is shifted axially on the shank of said stud.

3. A device of the class described, comprising a gasket having a non-circular pocket positioned medially in its upper face, a retaining shell for said gasket enclosing the upper face of said gasket and having a central aperture, means to space said shell away from the upper face of said gasket, and a stud having a non-circular head corresponding in shape to the shape of the pocket in said gasket and positioned axially of said gasket between the upper face of said gasket and said shell, said stud extending axially from the aperture in said shell, and said shell being shiftable on said stud to engage said head in said pocket.

4. A device of the class described, comprising a gasket having a non-circular pocket positioned medially in its upper face, a retaining shell for said gasket enclosing the upper face of said gasket and having a central aperture, means to space said shell away from the upper face of said gasket, and a stud having a non-circular head corresponding in shape to the shape of the pocket in said gasket and positioned axially of said gasket between the upper face of said gasket and said shell, said stud extending axially from the aperture in said shell, and said shell being shiftable on said stud to engage said head in said pocket, the extending end of said stud being cleft endwise and outwardly bowed to form a pair of spring arms, and means on the bowed portion of said arms to form an external thread.

5. A device of the class described, comprising a circular gasket having a non-circular pocket positioned medially in its upper face, a retaining shell enclosing the upper face of said gasket and having an annular ridge on its inner face against which said gasket is seated, said shell having a central aperture and being spaced away from the said upper face by said annular ridge, a stud having a non-circular head corresponding in shape to the shape of the pocket in said gasket and positioned axially of said gasket in the space between said gasket and said shell, said stud extending from said aperture, and said shell being axially shiftable on said stud to engage said head in said pocket.

6. A device of the class described, comprising a circular gasket having a non-circular pocket positioned medially in its upper face, a retaining shell enclosing the upper face of said gasket and having an annular ridge on its inner face against which said gasket is seated, said shell being spaced away from the said gasket by said annular ridge, a stud having a non-circular head shaped to fit into the pocket in said gasket and normally disposed between the upper face of said gasket and said shell, said stud extending from said aperture and said shell being axially shiftable on said stud, and the other end of said stud being cleft endwise and outwardly bowed to form a pair of adjustable spring arms, and means on the bowed portion of said arms to form an external thread.

7. A device of the class described, comprising a gasket, a retaining shell containing one face of said gasket, a washer having a central non-circular aperture therein interposed between the upper face of said gasket and said shell and secured against relative movement, a stud extending axially from said shell and having a non-circular head at its inner end shaped to fit into said aperture and be held against relative rotation, and means to space said washer from the inner surface of said retaining shell, said shell being shiftable axially on said stud.

8. A device of the class described, comprising a circular gasket, a retaining shell for said gasket enclosing one face thereof, a washer fixed between the upper face of said gasket and said shell and having a central non-circular aperture, a stud extending centrally from said shell and having a head at its inner end shaped to be received by the aperture in said washer and held against relative rotation, and means to space said washer from the inner face of said shell, said shell being shiftable along said stud to engage and disengage said head and washer aperture, the outer end of said stud being cleft endwise and outwardly bowed to form a pair of spring arms, and means on the bowed portion of said arms to form an external thread.

9. In a device of the class described comprising a gasket, a retaining member for said gasket having a central aperture, and a stud extending from said retaining member through said aperture, means arranged to engage the inner end of said stud and hold the same against relative rotation when said retaining member is shifted axially on said stud away from the inner end thereof.

10. In a device of the class described comprising a gasket, a retaining member for said gasket having a central aperture, a stud extending from said retaining member through said aperture, cooperating means on the inner end of said stud and within said retaining member arranged to be engaged and hold said stud and said retaining member against relative rotation when said retaining member is shifted axially on said stud away from the inner end thereof.

11. A device of the class described, comprising a gasket, a retaining shell for said gasket enclosing the upper face thereof and having a central aperture, means arranged to space said shell away from the upper face of said gasket and to provide a central chamber between said gasket and shell, a stud having a head disposed within said chamber and a shank extending through the aperture of said shell, and means on said head and other means below said chamber arranged to be engaged to hold said stud and said shell against relative rotation when said shell is shifted axially on the shank of said stud.

CHARLES S. POPE.